(12) United States Patent
Vandendriessche

(10) Patent No.: US 8,056,309 B2
(45) Date of Patent: Nov. 15, 2011

(54) FEED ROLL CONTROL SYSTEM FOR A FORAGE HARVESTER

(75) Inventor: Jean-Pierre Vandendriessche, Erpe-Mere (BE)

(73) Assignee: CNH America LLC, New Holland, PA (US)

( * ) Notice: Subject to any disclaimer, the term of this patent is extended or adjusted under 35 U.S.C. 154(b) by 231 days.

(21) Appl. No.: 12/454,508

(22) Filed: May 19, 2009

(65) Prior Publication Data
US 2009/0288382 A1 Nov. 26, 2009

(30) Foreign Application Priority Data
May 20, 2008 (EP) .................................. 08156560

(51) Int. Cl.
*A01D 61/00* (2006.01)
(52) U.S. Cl. .................................... 56/16.4 B
(58) Field of Classification Search ............... 56/16.4 B, 56/16.4 A, 16.4 R, 16.6, 60, 62; 241/37, 241/101.762, 222, 92, 232, 285.3; 144/246.1, 144/176, 246.2, 162.1; 460/7
See application file for complete search history.

(56) References Cited

U.S. PATENT DOCUMENTS

| | | | | |
|---|---|---|---|---|
| 4,073,377 | A | | 2/1978 | Stoessel et al. |
| 4,192,468 | A | * | 3/1980 | Lawrence et al. ...... 241/101.762 |
| 4,496,105 | A | | 1/1985 | Fleming et al. |
| 4,874,053 | A | * | 10/1989 | Kimura et al. ................ 180/443 |
| 5,020,579 | A | * | 6/1991 | Strong .......................... 144/176 |
| 5,491,647 | A | * | 2/1996 | O'Brien et al. ................. 701/99 |
| 6,052,975 | A | * | 4/2000 | Kraus et al. ................. 56/16.4 B |
| 6,290,599 | B1 | * | 9/2001 | Eis et al. .......................... 460/62 |
| 6,510,679 | B2 | * | 1/2003 | Krone et al. ...................... 56/62 |
| 6,530,311 | B1 | * | 3/2003 | Wilkens et al. ................ 100/40 |
| 6,584,755 | B2 | * | 7/2003 | Holtkotte .................. 56/10.2 B |
| 6,843,044 | B2 | * | 1/2005 | Clauss ......................... 56/10.3 |
| 6,996,961 | B2 | * | 2/2006 | Nickel et al. ............... 56/16.4 C |
| 7,140,169 | B2 | * | 11/2006 | Ameye et al. .................. 56/11.9 |
| 7,337,995 | B2 | * | 3/2008 | Van Vooren et al. ............ 241/37 |
| 7,540,136 | B2 | * | 6/2009 | Schafer ............................ 56/60 |
| 2001/0006874 | A1 | * | 7/2001 | Moore .............................. 451/5 |
| 2001/0041644 | A1 | * | 11/2001 | Yasuoka et al. ................. 477/37 |
| 2003/0038204 | A1 | * | 2/2003 | Nakazawa et al. ......... 242/434.4 |
| 2004/0093841 | A1 | * | 5/2004 | Clauss ...................... 56/16.4 R |
| 2007/0108323 | A1 | * | 5/2007 | Chapman et al. ............... 241/30 |
| 2007/0113533 | A1 | | 5/2007 | Schafer et al. |

FOREIGN PATENT DOCUMENTS
DE 19539143 4/1997
* cited by examiner

*Primary Examiner* — Arpad Fabian-Kovacs
(74) *Attorney, Agent, or Firm* — Michael G. Harms; Sue C. Watson

(57) ABSTRACT

A system to control the position of one or more feed rolls in a forage harvester. The system includes at least one fixed feed roll arranged to rotate around a rotation axis which is fixed with respect to a chassis of the harvester, and in cooperation with the at least one fixed feed roll, a movable feed roll arranged to rotate around a rotation axis which is movable towards or away from the corresponding fixed roll. The system determines various parameters, including input data for the driving force exerted on the rolls, position of the movable feed roll, and rotational speed of the drive shaft, and inputs the data to a control unit, which provides commands to one or more valves and to one or more throttles to control the movable feed roll via the hydraulic piston/cylinder arrangements.

6 Claims, 2 Drawing Sheets

FEED ROLL CONTROL SYSTEM FOR A FORAGE HARVESTER

CROSS REFERENCE TO RELATED APPLICATIONS

This Patent Application claims priority under 35 U.S.C. §119 to EP 08.156.560.8, filed on May 20, 2008 titled, "FEED ROLL CONTROL SYSTEM FOR A FORAGE HARVESTER" and having JEAN-PIERRE VANDENDRIESSCHE as inventor. The full disclosure of EP 08.156.560.8 is hereby fully incorporated herein by reference.

FIELD OF THE INVENTION

The present invention is related to forage harvesters used in agriculture for collecting and cutting crops. The invention is in particular related to a system for controlling the position of feed rolls arranged to feed the crops to a cutting drum.

STATE OF THE ART

Forage harvesters as described above comprise a feeder portion at the front of the machine, which receives the crop collected by a header, e. g. a corn header or a pick-up, and feeds it towards a cutting drum The feeder portion comprises feed rolls arranged horizontally, one or more lower feed rolls usually being arranged to rotate around a fixed rotation axis, while one or more upper feed rolls are arranged to rotate around a rotation axis capable of upward or downward movement. Two pairs of lower and upper feed rolls are usually provided. Resilient means, such as linear springs are provided in order to maintain sufficient pressure on the crops when the distance between upper and lower feed rolls varies as a function of the crop throughput. An example of such a spring-controlled system is disclosed in U.S. Pat. No. 6,779,326. The use of mechanical springs however does not ensure a constant pressure on the crops at all times.

Hydraulic means have been disclosed for this purpose, for example in FR-A-2740654, which discloses a hydraulic piston/cylinder arrangement for actuating and controlling the movement of the upper feed rolls. The control is based only on pressure measurements, while no controllable damping can be introduced in the system US-A-2007/0113533 discloses a system comprising an external force-actuated adjustment drive consisting of a hydraulic piston/cylinder arrangement, further provided with an additional mechanical spring for achieving a quick adaptation to sudden changes in the height of the transported crops. This system is however complex as it requires both hydraulic and mechanical actuating means. It further does not take account of the pull forces of the driven feed rolls on the crop layer and the consequent forces on the linkage connecting the feed rolls to the frame.

AIMS OF THE INVENTION

The present invention aims to provide an improved system for controlling the position of and the pressure exerted by the movable feed rolls, said system comprising hydraulic actuating and damping means.

SUMMARY OF THE INVENTION

The invention is related to a system and method as disclosed in the appended claims, and to a forage harvester equipped with such a system. Specific embodiments are disclosed in combinations of the independent claims with one or more of the claims dependent thereon.

The present invention is related to a system for controlling the position of one or more feed rolls in a forage harvester, said harvester comprising at least one fixed feed roll arranged to rotate around a rotation axis which is fixed with respect to a chassis of the harvester, and in cooperation with said at least one fixed roll, a movable feed roll arranged to rotate around a rotation axis which is movable towards or away from the corresponding fixed roll. The system comprises means for measuring parameters related to said feed rolls, such as the driving force exerted on said rolls, and means for actuating movement of the movable rolls by hydraulic piston/cylinder arrangements, installed in connection with the movable rolls. The invention is equally related to a forage harvester equipped with a system of the invention, and to a method for controlling the position of feed rolls in a forage harvester.

DETAILED DESCRIPTION OF THE INVENTION

Figure 1:
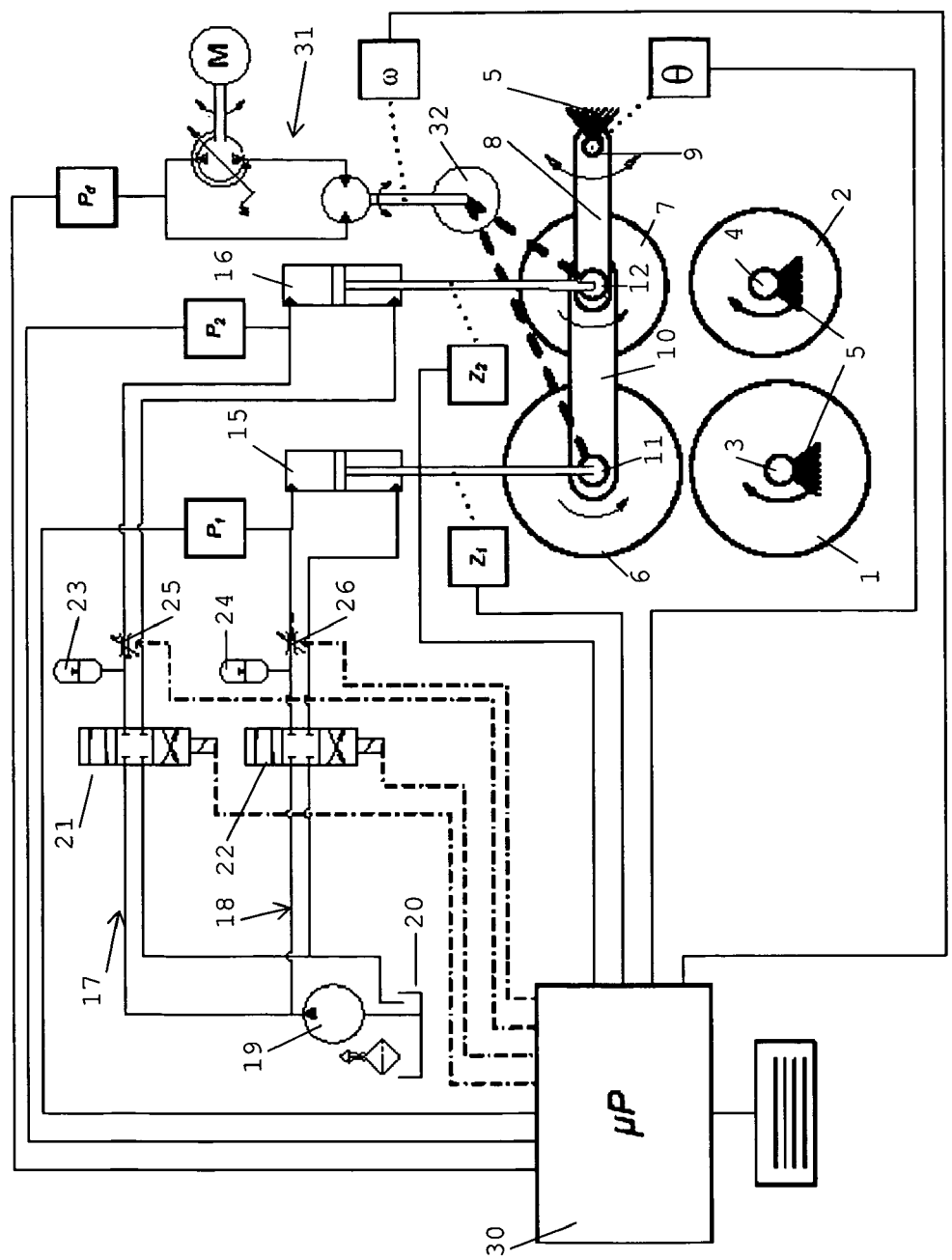
FIG. 1 illustrates an overview of a system according to the invention.

With reference to FIG. 1, a control system according to the invention is shown schematically, with respect to an exemplary feed roll arrangement installed in a forage harvester, comprising two lower rolls 1 and 2 arranged to rotate around rotation axes of shafts 3 and 4 which are fixed with respect to a main frame or a subframe 5 of the forage harvester, and two movable upper feed rolls 6 and 7, arranged to rotate around movable shafts 11 and 12. This feed roll arrangement is installed in the forage harvester so that harvested crops are fed from left to right on the drawing (i. e. front to back of the machine) through rotation of the feed rolls in the indicated rotation directions. The cutting drum (not shown) and stationary shearbar (not shown) are present to the right of the feed rolls. The feed rolls are powered by an external power source, through a gearbox transmission, as known in the art and not shown in the drawing. Upward and downward movement of the right hand side upper feed roll 7 is limited by the arms 8, present on both sides of the roll, and which are arranged at one end to pivot around fixed points 9 on the subframe 5. At the opposite end, the arms 8 hold the rotation axis 12 of the right hand side upper feed roll 7. Equally on either side of the rolls, pivotable connecting rods 10 connect the shafts 11, 12 of the upper feed rolls to each other.

Arranged between the movable shafts 11, 12 of each of the upper feed rolls and the main frame or subframe 5, are hydraulic piston/cylinder arrangements 15 and 16, installed in such a way that the movable portion (preferably the piston), is connected to the movable axis, and the stationary portion (preferably the cylinder) is fixed to the frame or subframe. In an installation of the type shown in U.S. Pat. No. 6,779,326, the cylinder/piston arrangements would be arranged in replacement of the mechanical springs.

Pairs of hydraulic lines 17 and 18 are present between a hydraulic pump 19 arranged to provide pressurised liquid from a hydraulic liquid tank 20, and the cylinder chambers located respectively on either side of the pistons, in order to actuate the piston movements and hence to position the upper feed rolls 6, 7. This is in the specific case of double-acting piston/cylinder arrangements, as shown. Single-acting piston/cylinder arrangements are equally possible, as is clear to the skilled person (see further), and in which a single hydraulic line may be provided for each piston/cylinder arrangement. The hydraulic action in upper or lower direction is steered by actuating hydraulic valves 21 and 22, which may be constituted as electrically controlled 3/4 valves. Accumulators 23 and 24 are present in connection with each of the lines extending between the valves 21, 22 and the upper cylinder chamber, in order to provide resilience to the piston/cylinder arrangements. The piston movements can be damped in a controlled manner by providing adjustable restrictors or throttles 25 and 26 in the hydraulic lines present between the valves 21, 22 and the upper cylinder chambers.

A number of sensors are shown, arranged to measure parameters, which are input (see dotted lines) into a control unit 30. The control unit comprises a microprocessor, configured for receiving measurement data, calculating set values on the basis of said data, and producing command signals for various components. In a system of the invention, at least one of the following parameters are measured and input into the processor:

- A measurement of the force exerted by the upper feed rolls on the crop. This may be done by measuring the torque T exerted on the main driving shaft at the input of the gearbox transmission through which both upper feed rolls are powered. A torque measurement as known in the art, and schematically represented by reference numeral 31 may be performed on the driving shaft, schematically represented by numeral 32 by appropriate sensors such as strain gauges. Alternatively, when the driving shaft is driven by a hydraulic motor of a hydrostatic drive, the torque T on the driving shaft 32 may be derived from the pressure difference $P_d$ between the drive and the return lines of the hydrostatic drive. The pressure difference is sensed by an appropriate pressure sensor, which is electrically connected to the control unit 30 for providing a signal indicative of the measured torque M Together with the rotational speed ω of the driving shaft 32, the measured torque M may also yield the power consumption as an input value to the microprocessor. The use of a power or torque measurement as input to hydraulic positioning means is not known in the art. It has been found that a direct relation exists between the power consumption and the upper feed roll position. Higher torque produced by higher throughput of crops (T/h) for example causes the upper feedrolls to be pushed upwards. For this reason, the measurement of the power consumption is a useful parameter for controlling the feed roll position. Other torque or force measurements may be performed that yield data which are equivalent to M and ω. Measurements may for example be performed directly on the axes of the feed rolls;
- A measurement of the upper feed roll positions $Z_1$ and/or $Z_2$, measured by known means. Measurement $Z_2$ may be replaced or verified by a measurement of the rotational position θ of the arm 8. A sensor providing the roll position signals may be integrated in the hydraulic piston/cylinder arrangements 15 and 16;
- A measurement of the hydraulic pressures $P_1$ and/or $P_2$ in the areas above the pistons in the piston/cylinder arrangements 15 and 16.

It is observed that the ingestion of crop material by the rolls 6, 7 not only causes vertical reaction forces, which are absorbed by the piston/cylinder arrangements 15, 16, but also substantially horizontal reaction forces following from the pulling action of the outer roll surfaces on the crop. The upper rolls 6, 7 commonly are provided with axially arranged ribs for better interaction with the layer of crop beneath. The resultant horizontal forces are absorbed by the connecting rods 10 and the arms 8. However, when the latter are not positioned along a straight line, these forces will tend to stretch the connection between the rods 10 and the arms 8 and hence add a vertical force component to the force on the rear roll 7. For instance, when a thick layer of crop is processed, the shafts 11, 12 of the front and rear rolls 6, 7 will take a position above the idle position shown in FIG. 1 and the arms 8 will be inclined upwardly and forwardly. The forward reaction force on the surface of the front roll 6 pulls on the connection rod 10 and thereby forces the rear roller 7 downwardly in an attempt to stretch the linkage constituted by the connection rod 10 and the arm 9. This downward force component is added to the vertical force from the piston cylinder arrangement 16.

Further vertical force components may result from the drive torque T on the gearbox transmission that powers both upper feed rolls 6, 7. When the hydraulic motor that drives the input shaft 32 is affixed to the main frame or subframe 5, the torque T will cause additional vertical reaction forces on the gearbox body and from there on the feed roll shafts 11, 12. For instance, if the driving shaft 32 enters the gearbox at a position between the shafts 11, 12, a counterclockwise shaft torque T will force the front roll 6 downwardly and the rear roll 7 upwardly. If the driving shaft would be connected at a point behind the rear roll 7, the same torque would force both rolls 6, 7 downwardly. These forces may assist or counteract the vertical forces caused by the hydraulic piston-cylinder arrangements 15, 16, depending on the rotation sense and the location of the input shaft 32.

The control unit 30 is arranged to produce control signals in response to the measured parameters (phantom lines), in particular control signals for actuating the valves 21, 22. According to the preferred embodiment, additional control signals are provided for actuating the throttles 25, 26. By providing controllable throttles in the hydraulic lines, more or less damping can be added to each of the cylinders.

Figure 2:
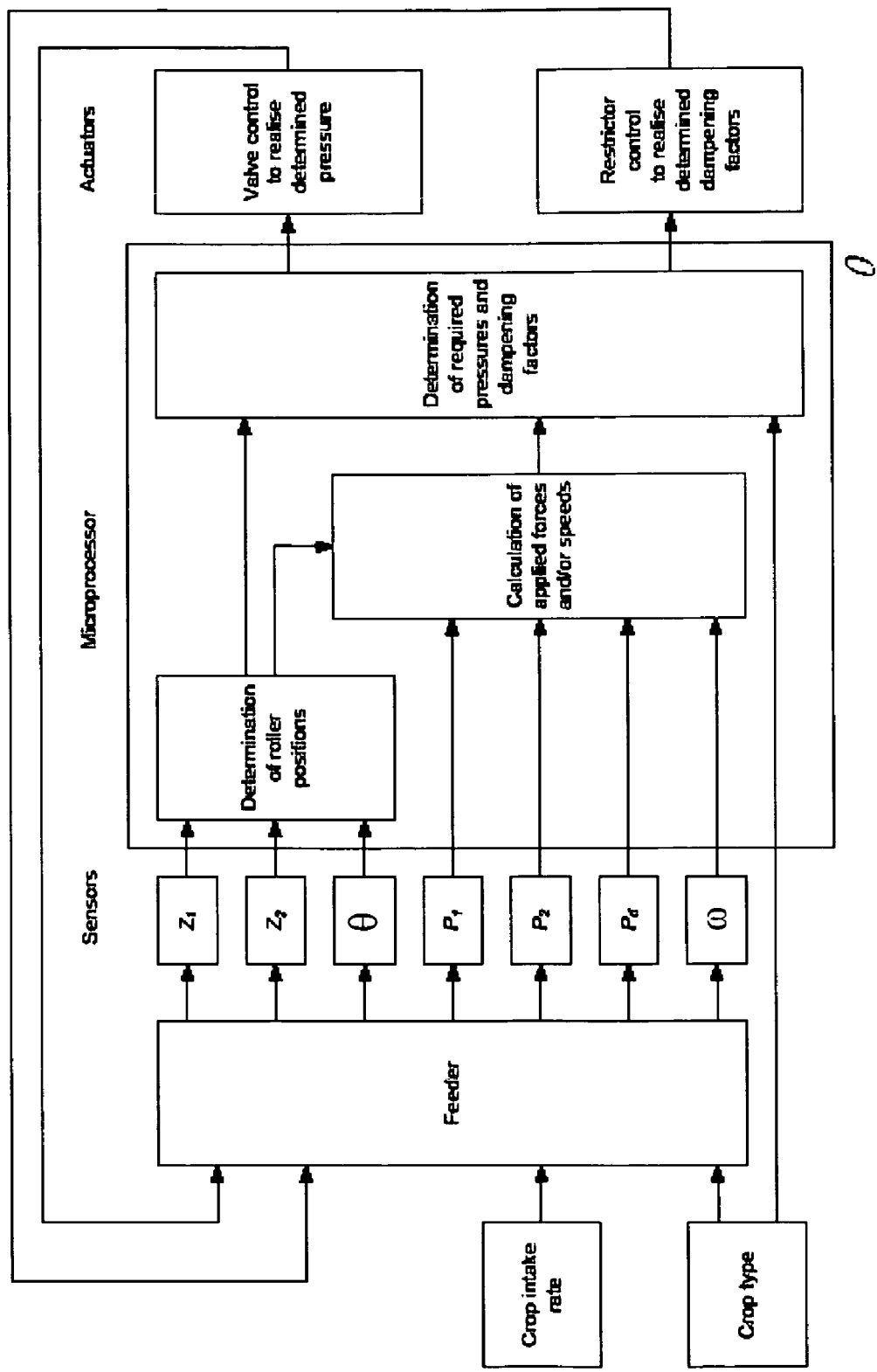
FIG. 2 shows the control circuit corresponding to the system of FIG. 1.

FIG. 2 shows a schematic view of the control circuit corresponding to the system of FIG. 1, comprising all the parameter sensors (not all of them being required). The microprocessor 30 determines the positions of the rolls 6, 7 from the position measurements $Z_1$, $Z_2$, or alternatively from the position measurement $Z_1$ of the front roll 6 and the angle measurement θ of the arm 8. The microprocessor further calculates the forces applied by the feed rolls 6, 7 on the basis of torque or power (T, ω, $P_d$) and pressure measurements ($P_1$,$P_2$) on the one hand and on the basis of position measurements ($Z_1$,$Z_2$) on the other. Both the force and/or speed information and the position information then serve as inputs for the determination of required pressures in the cylinders and the damping factors. Typically, higher roll positions will require higher compression forces to compensate for the higher friction forces that will occur between the thicker crop layer and the vertical plates on both sides of the rolls 6, 7. Excessive vertical speeds of the upper rolls is assessed through the position measurements $Z_1$ and $Z_2$ or θ. It may be damped by adjusting the throttles 25, 26. The microprocessor 30 then produces control signals for the valves and the throttles, in order to obtain said required pressures and damping factors. As indicated, the crop type may serve as an additional input into the processor. The crop type can be entered manually by the operator through a keyboard or from a menu.

As stated, the invention is not limited to the system and control circuit as shown in the drawings. Not all the measurements and outputs are required. One preferred embodiment comprises at least the measurement of the torque T or power consumption of the feed rolls (from $P_d$, M/ω or equivalent measurements), as an input to the processor.

The valves 21 and 22 shown in the drawings are 4 port/3 position valves connected to double-acting hydraulic piston/cylinder arrangements. These could be replaced by 3 port/3 position valves, in which case only one cylinder chamber, above or below the piston, is connected to pump 19 or tank 20, the connection to pump or tank being controlled by the position of the valve. Single-acting actuated piston/cylinder arrangements can be used in this case.

The invention claimed is:

1. A system for controlling the position of one or more feed rolls in a forage harvester, the harvester comprising at least one fixed feed roll arranged to rotate around a rotational axis which is stationary with respect to a chassis of the harvester, and at least one movable feed roll arranged to rotate around a rotational axis which cooperates with the at least one fixed feed roll, and is movable towards or away from the corresponding fixed feed roll to move a crop therethrough, the system comprising:
   at least one piston/cylinder arrangement arranged to control movement of the movable feed roll towards or away from the corresponding fixed roll;
   a hydraulic pressure source and at least one hydraulic connecting line positioned between and connected to the hydraulic pressure source and the piston/cylinder arrangement;
   input data from a plurality of sensors including rotational speed of a drive shaft of the movable feed roll, position of the movable feed roll, and driving force,
   wherein the driving force is determined by at least one of
   a) torque of the moveable feed roll, or
   b) pressure difference between a hydrostatic drive and return lines of the hydrostatic drive, and
   a control unit configured for receiving the input data of the rotational speed of the drive shaft, the driving force, and the position of the movable feed roll, the control unit further configured to calculate a command signal as a result of the receipt of at least one of
   a) input data of the driving force and the position, or
   b) input data of the rotational speed of the drive shaft and the position, the control unit configured to send one or more command signals to control at least the moveable feed roll; and
   an apparatus to actuate movement of the movable feed roll in response to at least one command signal, the apparatus including
   a) a valve configured to control hydraulic pressure in the piston/cylinder arrangement, and
   b) a throttle configured to damp hydraulic pressure in the piston/cylinder arrangement.

2. The system according to claim 1, wherein the plurality of sensors includes a pressure sensor for measuring pressure data in the piston/cylinder arrangement, and wherein the control unit is configured to calculate a desired pressure in the piston/cylinder arrangement as a function of receipt of driving force data as well as position and pressure data, and for sending out command signals to the apparatus in order to obtain the desired hydraulic pressure.

3. The system according to claim 1, further comprising at least one hydraulic accumulator arranged in connection with the hydraulic line.

4. The system according to claim 1, wherein the movable feed roll is driven by a hydraulic motor and the driving force input data further includes the pressure in the hydraulic line to the motor.

5. The system according to claim 1, comprising a front and a back set of feed rolls, each set comprising a fixed lower feed roll and a movable upper feed roll, the movable upper feed roll of the back set being connected to the harvester by pivotable arms, the upper feed rolls being connected together by connecting rods.

6. The system according to claim 5, wherein the plurality of sensors includes a sensor for determining the rotational position of the arms.

* * * * *